Figure 2:
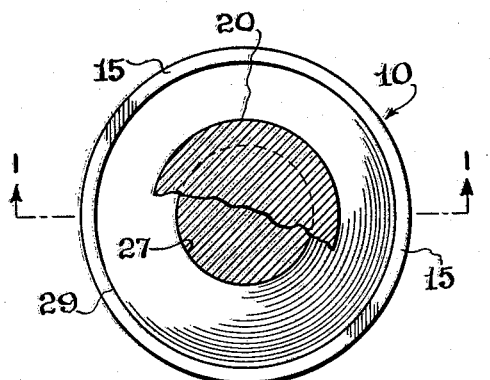

Oct. 13, 1964 H. ORNER 3,152,797
SPRING MECHANISM

Filed April 17, 1962 2 Sheets-Sheet 1

INVENTOR
*Harry Orner*

Oct. 13, 1964 H. ORNER 3,152,797
SPRING MECHANISM

Filed April 17, 1962 2 Sheets-Sheet 2

INVENTOR
*Harry Orner*

United States Patent Office 3,152,797
Patented Oct. 13, 1964

3,152,797
SPRING MECHANISM
Harry Orner, 2479 Glen Canyon Road, Altadena, Calif.
Filed Apr. 17, 1962, Ser. No. 188,112
15 Claims. (Cl. 267—1)

This invention relates to a spring mechanism and more particularly to a new and improved device operable to convert a force into radial displacement of a resilient annular element.

This invention is a continuation-in-part of my copending application, Serial Number 27,591, filed May 9, 1960, for Spring Mechanism, granted March 5, 1963, as Patent 3,080,159. Reference is also made to copending application, Serial Number 78,055, filed December 23, 1960, for Spring Mechanism, granted March 5, 1963, as Patent 3,080,160. Reference is also made to application, Serial Number 684,310, filed September 16, 1957, for Spring Mechanism, now abandoned.

Spring mechanism are required in a variety of applications having the need to absorb and release energy. A spring may be defined as an elastic body whose primary function is to deflect or distort under load and which recovers to its original shape when released after being distorted. Such springs come in various forms using various means of stressing resilient material. All springs have the primary consideration of load and deflection which is the mathematical function of the energy stored therein.

An ideal spring would consist of a simple straight bar of uniform section subjected to an axial load at its end. Since the bar is loaded axially the stress distribution across the section is uniform and for this reason it represents the optimum condition from the standpoint of maximum energy storage per unit volume of material. The tension yield point would be considered the limiting stress and the deflection would vary directly with the length of the bar. If the bar is subject to fatigue or repeated loading, the stress at the endurance limit would be limited by the stress concentration present near the end of the bar where it would be clamped or changed in section. This would reduce the ideal maximum load and deflection for practical use. Such springs are thus subject to this and other disadvantages outstanding among which are the limited deflection to the length of the bar. Springs of other forms use means for increased deflection at a large sacrifice of the maximum allowable load.

The present invention provides a spring mechanism obviating the foregoing major disadvantages and others as will be apparent by the following disclosure. In lieu of the bar in any of the forms of former designs, this invention employs an annular spring element having no ends to clamp and uses the displacement in circumferential stress of this spring element to get a variety of designed deflection relationship at high values of load.

It is the primary object of this invention to provide an improved spring mechanism of relative high value of energy capacities with a wide range of load-deflection relationship.

Another object of this invention is to provide a spring mechanism utilizing substantially all the spring material in tensile stress.

Another object of this invention is to provide a spring mechanism wherein the spring element is annular in shape and is displaced radially.

Another object of this invention is to provide a spring mechanism that can be adapted for use in extreme temperature ranges.

Another object of this invention is to provide a high load spring member that can be mounted concentrically with a shaft or rod member.

Another object of this invention is to provide a spring mechanism using a spring element consisting of an annular member made by circumferentially winding a fiber and impregnating these fibers with a plastic material.

Another object of this invention is to provide a spring mechanism having an exceedingly high ratio of energy capacity relative to its weight.

Another object of this invention is to provide a spring of such small size relative to its load capacities as to be feasible to be used with a threaded fastener as a rated spring mechanism to establish the stress in said fastener resulting from the applied torquing load on said fastener.

Another object of this invention is to provide a plurality of nested annular spring elements in a circumferentially prestressed state to further increase the ratio of energy absorbing capacity per weight of this invention.

Another object of this invention is to provide an article of manufacture of simple construction for economical fabrication.

Figure 4:
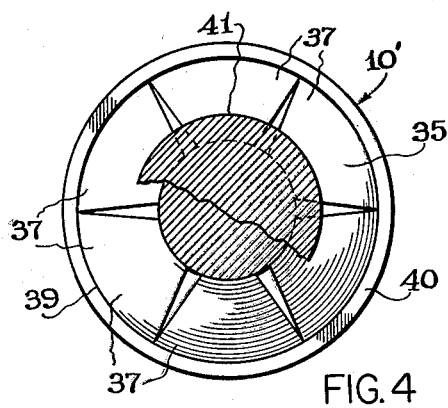
Figure 1:
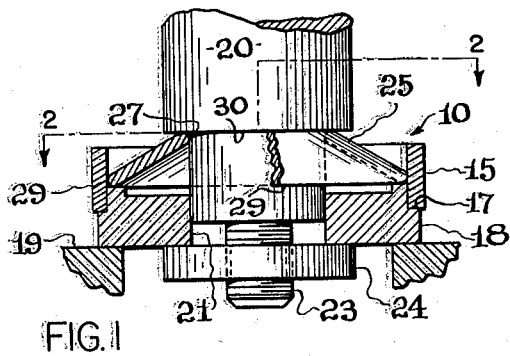
Figure 10:
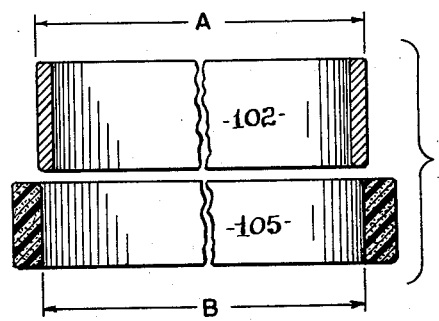
Figure 3:
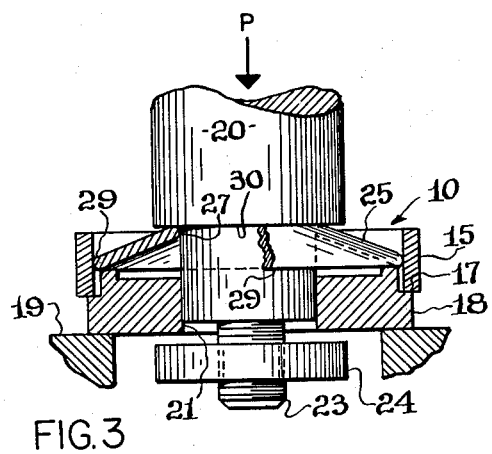
Figure 11:
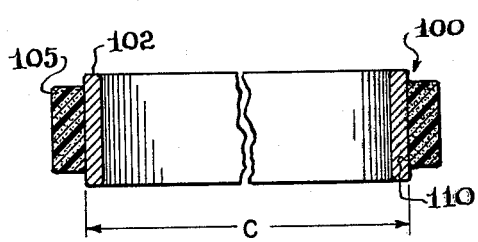
Figure 5:
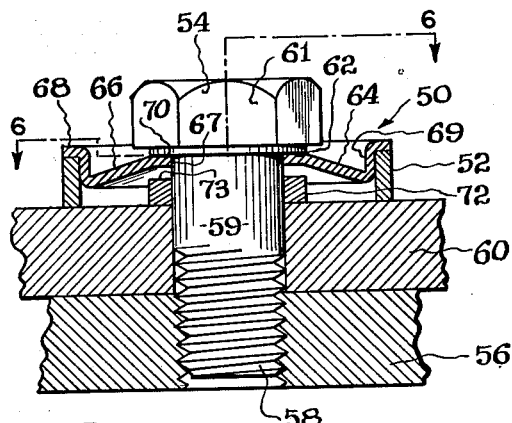
Figure 6:
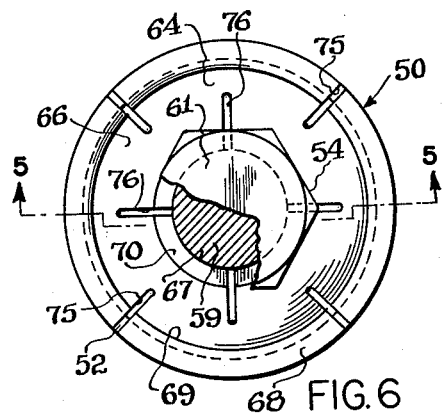
Figure 7:
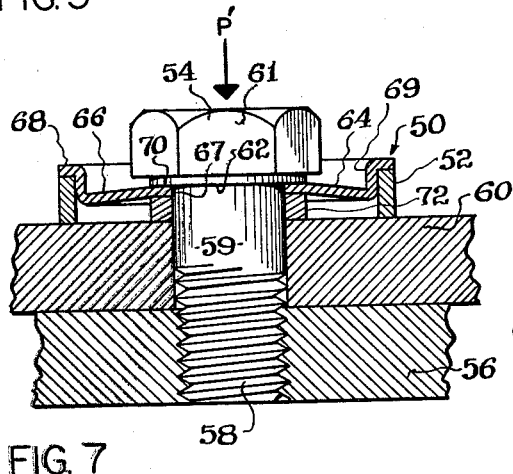
Figure 8:
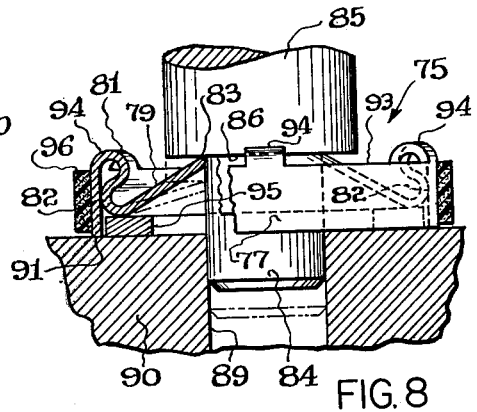
Figure 9:
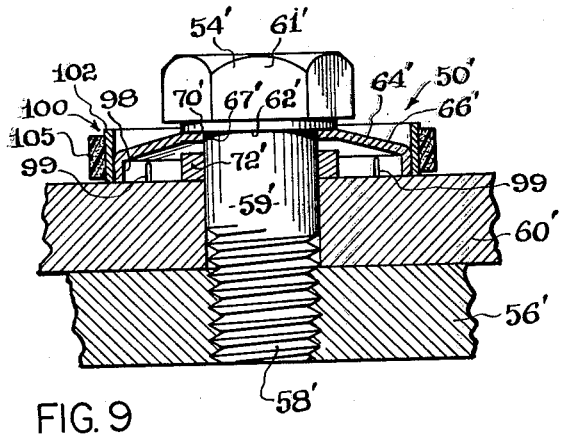

Other objects of this invention will become fully apparent as reference is had to the accompanying drawings wherein my invention is illustrated and which:

FIGURE 1 is a sectional view taken on plane 1—1 of FIGURE 2, illustrating a form of my invention, FIGURE 2 is a sectional view taken on plane 2—2 of FIGURE 1, FIGURE 3 is a view similar to FIGURE 1 but in an alternate position, FIGURE 4 is a view similar to FIGURE 2 with a modification of an element therein, FIGURE 5 illustrates a modified form of my invention, which is a sectional view taken on plane 5—5 of FIGURE 6, FIGURE 6 is a sectional view taken on plane 6—6 of FIGURE 5, FIGURE 7 is a view similar to FIGURE 5 but in an alternate position, FIGURE 8 illustrates a modification of my invention, which is an elevational view with portions broken away, FIGURE 9 illustrates a modification of my invention, which is an elevational view with portions broken away, FIGURE 10 is an enlarged expanded view of the annular spring elements of FIGURE 9, in their unassembled relation, and FIGURE 11 is the assembled view of the annular spring elements of FIGURE 10.

The spring mechanism 10 in FIGURES 1 and 2, consists of a spring ring element 15, supported on a shoulder 17 of a base member 18. The base member 18 abuts a structural support 19. A shaft member or rod member 20 extends through a center hole 21 in the base member 18. The lower reduced end 23 of rod 20 is threaded to receive a nut 24 thereon. A transfer member 25 in the form of a dished disk with a center hole 27, is seated on the base member 18 with its outer circumferential edge 29 contacting the inside circumferential wall of the ring 15. The inner circumferential edge 27 of the dished disk member 25 contacts the rod member 20 at the annular shoulder 30. The dished disk member 25 and the base member 18 are retained in assembly between the shoulder 30 of the rod 20 and the nut 24.

A load P on the rod member 20 forces it downward, see FIGURE 3, with internal fiber displacement to cause the dished disk member to take a flatter shape with an increase in its outer circumferential edge 29, to displace the spring ring element 15 radially in elastic hoop stress.

On releasing the load P on the rod member 20, the spring element 15 contracts in circumferential edge, forcing the dished disk 25 radially inward, to move the rod member 20 at the inner circumference 27 of the dished disk member 25 to the original position of the rod member 20 as shown in FIGURE 1.

The transfer member 25 may be made in the form of a frusto-conical spring of the commonly known dished disk springs often referred to as Belleville springs which as an element in itself constitutes a spring structure. When used in the structure of spring mechanism 10, it is greatly supplemented by the spring ring element 15. In many cases of high loading values the resilience of the frusto-conical spring or Belleville spring may be of small consideration. The frusto-conical spring may be radially slotted to reduce its spring loading as is commonly known to the art.

The spring ring 15, taking the elastic tensile stress, can be made of any springy material, and it may be preferred that this material have a maximum optimum value of yield point and elasticity relative to other qualities of consideration. The cross-sectional wall area of the ring 15 should be uniform along its entire circumference for maximum elongation and efficiency.

Material such as heat treated spring steel, aluminum, or any metal could be used, but a less rigid material may be more ideally suited in certain applications. Reinforced glass fiber may be used to great advantage because of its unique combination of high elastic stress limit and tensile strength. In the ring spring element 15, glass fiber would be wound around a mandrel in a circular direction for maximum hoop tensile strength. From the tests on pressure vessels it was found that glass-reinforced plastics actually represent a spring material of unique properties for the following reasons:

Glass filaments have a modulus of elasticity in tension of 10,000,000 p.s.i. and an elastic elongation from 3% to 4%, resulting in an elastic limit from 300,000 to 400,000 p.s.i.

Such unidirectional glass fiber structure were found to have a moduli of elasticity in the range from 3,000,000 p.s.i. to 6,000,000 p.s.i., depending on the pattern of winding and glass density. The elastic limit of strain is upward of 3%, or 0.30 inch per inch, and the tensile strength up to 200,000 p.s.i. have been measured in the direction of the fibers.

An important aspect of the spring mechanism 10 is that it can be fabricated completely out of material that can be used for high temperature environment. For example a spring mechanism 10 was completely fabricated from material, which has good temperature characteristics ranging from the yield strength of 215,000 p.s.i. at 70 degree F., to 207,000 p.s.i. at 900 degree F. The material machines well and can be spun or cold formed.

The force P required to expand the spring ring element 15 is a factor of the radial cross-sectional area and the modulus of elasticity of the material. This cross-sectional area can be considered in tension and the stress distribution on the circumference is substantially uniform and for this reason it approaches the optimum condition for maximum energy storage. The tensile yield point can be considered the limiting stress and the deformation would vary directly with the circumference of the spring ring 15. If the ring is continuous and uniform on the entire circumference there would be no area of stress concentration to reduce the maximum load when subject to fatigue or repeated loading.

In certain embodiments the transfer member 25 may be made of a different structure, and such further modification can be made which is illustrated in FIGURE 4, for a spring mechanism 10′ by substituting for the transfer member 25, a transfer member 35, consisting of radially divided segments 37. The segments 37 being assembled with their outer radial edges touching to form the outer circumferential edge 39 that contact the inner circumferential wall of the spring ring element 40, as shown in FIGURE 4. The inner edges of the segments 37 that contact the shaft 41 are decreased in arcs for free movement of the transfer member 35.

The movement of shaft 41 in FIGURE 4, will move each segment 37 to increase its assimilated circumferential edge 39 to displace the ring spring element 40 radially to stress it in hoop stress with minimum fiber stress in the segments 37 of member 35

Thus provided is a spring mechanism which has large energy absorbing capacities relative to its size or weight. One particular use of such spring mechanism could be used with screw fasteners to act as an energy storing lock washer at a rated predetermined spring value to establish a desired tensile stress value in the rod member or shank of such fasteners.

FIGURES 5, 6, and 7, indicate such spring mechanism 50 of a modified construction. A ring spring element 52, concentrically located with a commercial cap screw 54, threaded into a plate 56, by the coacting thread 58 formed on the extreme end of shank 59 of the cap screw 54. Shank 59 fits through a second plate 60. A lower surface of plate 60 contacts the top surface of plate 56. The cap screw 54 is torqued into place by means of a head 61 with provided wrenching configurations such as a hexigon perimeter. The head 61 forms a radial shoulder 62.

FIGURE 5, indicates the relative position of the cap screw 54 just prior to its final wrenching. The shank 59 is in the unstressed state. The transfer member 64 consists of a dished disk section 66 similar to that described in FIGURES 1, 2, and 3, but in addition it has an integral annular flange 68 extending radially to contact the top annular edge of ring spring element 52. A cylindrical angular section 69 connects the flange 68 to the dished disk section 66, and fits into the inner circumferential wall of ring 52. The dished disk of frusto-conical section 66 extends radially inward with an inner circumferential edge 67 contacting the shank 59, with a land surface 70 thereon contacting the shoulder 62 of the cap screw 54. A washer 72 may be provided on the upper surface of plate 60 with an abutting surface 73 a predetermined distance below the lower surface of land 70. The transfer member 64 may be made of a solid disk structure similar to that shown in FIGURE 2, or may be slotted in radial slots 75 and 76 as indicated in FIGURE 6. In the solid frusto-conical structure a further spring value can be added to the spring value of the spring mechanism 50. In the slotted structure it may be desirable to relieve the internal fiber stresses in the transfer member 64 to get increased axial deflection, to thereby apply more radial strain to ring member 52, approaching the structure illustrated in FIGURE 4.

FIGURE 7, illustrates the alternate position of FIGURE 5, when the cap screw 54 is wrenched to the final torqued position by a load P′ resulting from the spiral coaction of the mating threads. The shank 59 is in its extreme stressed state, and the dished disk section 66 takes a flatter configuration. The outer ring section 69 is increased in circumference, at least at the area of junction between the dished disk section 66 and the ring section 69. The ring spring element 52 is stressed in hoop stress at a predetermined value to stress shank 59 to the required load value of P′. The inner area of dished disk section 66 at the lower surface of land 70 abuts the surface 73 of washer 72 which establishes the extreme deflection of the spring mechanism 50.

It may be further desirable to fabricate the above transfer member integral with ring member. FIGURE 8, illustrates such modification. A spring mechanism 75 is provided made of a ring section 77 and a dished disk or frusto-conical section 79 connected by an annular reversed curved section 81 with a circumferential lower section of the reversed curved section abuts the inner circumferential wall of ring section 77 at 82. The inner circumferential edge 83 of dished disk section 79 contacts the reduced circumferential wall 84 of a rod 85. A shoulder 86 formed by the reduced circumferential wall 84 abuts the dished disk section 79 axially at the area at the inner circumferential edge 83. Reduced circumferential wall 84 is free to move axially through a hole 89 in a base plate 90. Base plate 90 acts as an abutment for the lower radial edge 91 of ring section 77.

The spring mechanism 75 as actuated by a force to move the rod 85 downward, will cause the dished disk 79 to take a flatter configuration as indicated in the broken lines of FIGURE 8, forcing the ring section 77 to be stressed in hoop stress.

This spring mechanism 75 constitutes an economical structure, which can be fabricated by a progressive stamping process, with some losses as to its spring energy efficiency due to bending or shear stresses at the reverse curved section 81.

This can be compensated to an extent, by cutting out parts of this section 81 in arcs 93, leaving arc section 94 to support the dished disk section 79 to contact the ring section 77 at 82. A washer 95 placed directly under the lower portion of the reversed curved section 81 could be used to further support the dished disk section 79 in place.

Since the spring mechanism 75 is fabricated from a single thickness of material the ring section 77 may be limited in radial sectional thickness. This can be compensated by a reinforcing ring 96. This as illustrated could be made of reinforced glass fiber referred to above, or any material desirable to take a hoop stress. The spring mechanism 75 can further be slotted radially in any desired manner such as indicated in FIGURE 6, to increase axial deflection.

FIGURE 9, illustrates a modification of a spring mechanism 50' which in general is similar to the embodiment illustrated in FIGURE 5, but with an important improvement in the hoop stressed ring structure which may be adapted for such applications requiring further increase in the ratio of spring loading per weight.

The transfer member 64' is also modified to consist of a dished disk section 66' integral with a flange 98, turned downward forming a cylindrical wall, with the lower radial edge contacting the surface of plate 60'. The flange 98 spaces the dished disk section 66' a predetermined distance from the surface of the plate 60' and bears the axial load of deflection of the transfer member 64'. The cylindrical wall 98 may be slotted at 99 to relieve the stresses therein.

The balance of the component elements are similar to the embodiment illustrated in FIGURE 5, and have similar reference characters with a prime added, with the exception of the hooped stressed ring structure which will now be explained in detail.

The spring element 100 as illustrated in FIGURE 9, and in enlarged views in FIGURES 10 and 11, consist of an inner ring 102 and an outer ring 105.

In all the above embodiments if the walls of the rings 15, 40, 52, and 82, are relatively thin, less than about one-tenth the radius and with no abrupt changes in thickness, slope, or curvature, the hoop stress is practically uniform throughout the thickness of the wall and are the only stresses of importance present, the radial stress and such bending stresses as occur being negligibly small. If the wall thickness of these rings are more than one-tenth the radius, the hop stress cannot be considered uniform through the thickness of the wall, and the radial stresses cannot be considered negligible. These stresses in thick rings, must be found by quite different involved calculation from those used in finding membrane stresses in thin rings. Though this invention is not limited in the thickness of the rings, it may be further desirable in required embodiments, such as calibrated springs to increase the load carrying capacities of this spring mechanism without resorting to increased thickness, to attain a linear relationship of stress to strain.

Inner ring 102 and outer ring 105 as illustrated in FIGURE 10, are formed to be telescoped into an assembly as illustrated in FIGURES 9 and 11, to stress ring 105 in hoop tension and ring 102 in hoop compression. Inner ring 102 is fabricated with a diametrical dimension A on its external circumference of a magnitude larger than diametrical dimension C in FIGURE 11. Outer ring 105 is fabricated with a diametrical dimension B on its internal circumference smaller than diametrical dimension C. These rings are assembled by forcing inner ring 102 into outer ring 105 by pressing them axially into place with the resulting diametrical dimension C at the abutting circumferences 110 as indicated in FIGURE 11. This also may be done by thermal process of heating the outer ring 105 to expand the dimension B, or cooling the inner ring 102 contract the dimension A, so that they could be assembled. Any combination of these means can be used to attain the telescoped assembly of FIGURE 11.

Dimension A of ring 102 should be of such magnitude as to place the inner ring 102 in compressive stress, say for example, to the elastic limit of the material. Dimension B should be of such magnitude as to place the outer ring 105 in tensile stress to a predetermined stress below the elastic limit.

In FIGURE 9, as the cap screw 59' is torqued with a load on transfer member 66' to deflect it and to expand the ring 102. The ring 102 will now be expanded from its elastic compressed state to its normal unstressed state of dimension A, and from dimension A to its elastic hoop tensile stress. A magnitude capability of substantially twice the displacement of the above single ring elements. Outer ring 105 must be made of material of greater elastic limit since it takes a displacement in tensile strain of swice that of the inner ring. One of such materials is the reinforced glass fiber structure as disclosed above or aluminum which has a smaller modulus of elasticity.

The ring structure indicated in FIGURE 11, can be used in place of the spring rings 15, 40, and 52, of the above embodiments, if a still larger maximum load to weight ratio is required.

Thus provided is spring mechanism 10, 10', 50, 50', and 75, that can be mounted on a shaft or rod member and stressed by an axial force to displace an annular element of resilient material, such as reinforced fiber glass structure or any other material in hoop stress to store energy at a relative high value. Also provided is a resilient annular means of a plurality of telescoped rings in a pre-stressed relation to increase the energy capacities of the above spring mechanism.

While these particular spring mechanisms disclosed are fully capable of attaining and providing the advantages therebefore stated, it is to be understood that they are merely illustrative of the present preferred embodiments of the invention and that no limitations are intended to the details of construction or design herein shown other than as defined in the appended claims.

In the claims:

1. In a spring mechanism, a rod member, a resilient ring means of uniform radial thickness along an effective circumferential area mounted concentrically with said rod member, a shoulder on said rod member, a displaceable dished disk means located between said rod member at said shoulder and said resilient ring means to transmit relative axial movement of said rod into axial displacement of said disk means, to thereby stress said resilient ring elastically at said effective circumferential area in tensile hoop stress, in which said dished disk means is formed of a plurality of radially divided segments.

2. In a spring mechanism, a rod member, a resilient ring means of uniform radial thickness along an effective circumferential area mounted concentrically with said rod member, a shoulder on said rod member, a displaceable dished disk means located between said rod member at said resilient ring means to transmit relative axial movement of said rod into axial displacement of said dished disk means, to thereby stress said resilient ring means elastically at said effective circumferential in tensile hoop stress, in which said dished disk means being of uniform thickness which includes an annular flange extending radially to abut the radial end of said resilient ring means in an axial direction, to support said dished disk means in relation to said resilient ring means.

3. In a spring mechanism, a rod member, a resilient ring means of uniform radial thickness a long an effective circumferential area mounted concentrically with said rod member, a shoulder on said rod member, a displaceable dished disk means located between said rod member at said shoulder and said resilient ring means to transmit relative axial movement of said rod into axial displacement of said dished disk means, to thereby stress said resilient ring means elastically at said effective circumferential area in tensile hoop stress, said displaceable dished disk means is a frusto-conical ring with an internal circumferential edge abutting the said rod at said shoulder, and an external circumferential edge abutting the inside circumferential wall of said resilient ring, and means to guide said rod axially, said frusto-conical ring and said resilient ring is a unitary member connected by a reversed curve section.

4. In a spring mechanism, a rod member, a resilient ring means of uniform radial thickness along an effective circumferential area mounted concentrically with said rod member, a shoulder on said rod member, a displaceable dished disk means located between said rod member at said shoulder and said resilient ring means to transmit relative axial movement of said rod into axial displacement of said dished disk means, to thereby stress said resilient ring means elastically at said effective circumferential area in tensile hoop stress, said displaceable dished disk means is a frusto-conical ring with an internal circumferential edge abutting the said rod at said shoulder, and an external circumferential edge abutting the inside circumferential wall of said resilient ring, and means to guide said rod axially, said frusto-conical ring includes an annular flange on its outer circumferential edge in the form of a cylinder abutting the inside circumferential wall of said resilient ring means in an axial direction, a base member supporting said resilient ring means, and the radial edge of said cylinder flange abutting said base member to support said frusto-conical ring in place with said resilient ring means.

5. In a spring mechanism, a rod member, a resilient ring means of uniform radial thickness along an effective circumferential area mounted concentrically with said rod member, a shoulder on said rod member, a displaceable dished disk means located between said rod member at said shoulder and said resilient ring means to transmit relative axial movement of said rod into axial displacement of said dished disk means, to thereby stress said resilient ring means elastically at said effective circumferential area in hoop tensile stress, said displaceable dished disk means is a frusto-conical ring with an internal circumferential edge abutting the said rod at said shoulder, and an external circumferential edge abutting the inside circumferential wall of said resilient ring, and means to guide said rod axially, said resilient ring means consist of a pair of prestressed rings assembled in concentric relation consisting of an inner ring and an outer ring, said inner ring is circumferentially prestressed in compression, and said outer ring is circumferentially prestressed in tension.

6. In a spring mechanism, a rod member, a resilient ring means of uniform radial thickness along an effective circumferential area mounted concentrically with said rod member, a shoulder on said rod member, a displaceable dished disk means located between said rod member at said shoulder and said resilient ring means to transmit relative axial movement of said rod into axial displacement of said dished disk means, to thereby stress said resilient ring means elastically at said effective circumferential area in tensile hoop stress, said displaceable dished disk means is a frusto-conical ring with an internal circumferential edge abutting the said rod at said shoulder, and an external circumferential edge abutting the inside circumferential wall of said resilient ring, and means to guide said rod axially, said rod includes a spiral thread, a threated abutting member coacting with said spiral thread on said rod member, said coacting threaded member operable to axially stress said rod member between said shoulder and said abutting member relative to the hoop stress in said resilient ring means.

7. In a spring mechanism, a resilient ring means, a center member located within said resilient ring means and relatively moveable axially in reference to said resilient ring means, transfer means extending radially between said resilient ring means and said center means and adaptable to transfer the relative axially directed force of said center means to radially displacement of said resilient ring means in hoop stress, said resilient ring means includes a concentric assembly of an internal ring circumferentially prestressed in compressive stress and an external ring circumferentially prestressed in tensile stress abutting on a common circumference, wherein said internal ring is stressed in hoop stress from a compressive stress to a tensile stress.

8. The invention as claimed in claim 7, in which said external ring is formed of fiber wound in a circular direction and reinforced in a solid material.

9. In a spring mechanism, a resilient ring means, an element within said ring moveable axially by a force thereon, means within the periphery of said ring to transmit said axially directed force on said element into radial displacement of said resilient ring means to thereby stress it elastically in hoop stress, said resilient ring means includes two concentric rings abutting on a common circumference including an external ring and an internal ring, said external ring being circumferentially prestressed in tensile stress, said internal ring being circumferentially prestressed in compressive stress, wherein said internal ring is stressed in hoop stress from compressive stress to tensile stress and said external ring is stressed in hoop stress to an increased tensile stress upon axial movement of said element.

10. In a spring mechanism, comprising a ring assembly including an internal ring and an external ring abutting on a common circumferential surface, said internal ring being prestressed in circumferential compressive stress, said external ring being prestressed in circumferential tensile stress, actuating means to stress said internal ring elastically in a radial direction to stress it from circumferential compressive stress to circumferential tensile stress.

11. In a spring mechanism, a shaft member, a shoulder on said shaft member, a frusto-conical member with an internal circumferential edge abutting radially said shaft member at said shoulder, a resilient ring, said frusto-conical member extending radially to an external circumferential edge to abut the internal circumferential wall of said resilient ring, a base member supporting said resilient ring, means to apply an axial load on said shaft member to thereby deflect said frusto-conical member to be moved radially to increase said external circumferential edge, to stress said resilient ring in hoop stress, said base member includes structure to guide said rod axially.

12. The invention as claimed in claim 11, in which said frusto-conical member and said resilient ring are joined by an annular reversed curved section to form a unitary member, a portion of said reverse curved section includes said external circumference.

13. The invention as claimed in claim 12, in which a second resilient ring is pressed on the outer circumference of said integral resilient ring of said unitary member.

14. In a spring mechanism, a rod member, a reduced diameter portion of said rod member forming a radial shoulder, a base member, a hole in said base member coacting with said reduced diameter portion to guide said rod axially, a resilient ring concentrically located with said rod and axially supported on said base member, a frusto-conical ring with an internal circumferential edge abutting said reduced diameter portion radially and abutting said shoulder axially, an external circumferential edge on said frusto-conical ring abutting the inside circumferential wall of said resilient ring, means to apply a force on said rod, to thereby axially deflect said frusto-conical ring to increase said external circumferential edge, to radially stress said ring elastically in hoop stress.

15. The invention as claimed in claim 14, in which said means to apply an axially directed force includes a screw thread formed on the said reduced diameter portion of said rod, an internal threaded screw member coacting with said screw thread of said rod, said mating screw threads operable to apply an axial load on said rod between said shoulder and said internal screw member to stress said rod therebetween in tensile stress in relationship to the hoop stress in said resilient ring.

References Cited in the file of this patent

UNITED STATES PATENTS

| | | |
|---|---|---|
| 404,284 | Johnson | May 28, 1889 |
| 1,641,059 | Tausch | Aug. 30, 1927 |
| 1,826,597 | Brecht | Oct. 6, 1931 |
| 2,073,146 | Gardiner | Mar. 9, 1937 |
| 2,432,717 | Berger | Dec. 16, 1947 |
| 2,776,851 | Heinrich | Jan. 8, 1957 |
| 2,879,986 | Maier | Mar. 31, 1959 |
| 2,952,453 | Haussermann | Sept. 13, 1960 |
| 2,983,121 | Naas | May 9, 1961 |
| 2,983,503 | Haussermann | May 9, 1961 |
| 3,013,792 | Steinlein | Dec. 19, 1961 |

FOREIGN PATENTS

| | | |
|---|---|---|
| 857,611 | Great Britain | Jan. 4, 1961 |